Nov. 27, 1934.  N. R. BROWNYER  1,982,043
CAR WHEEL
Filed Dec. 23, 1931
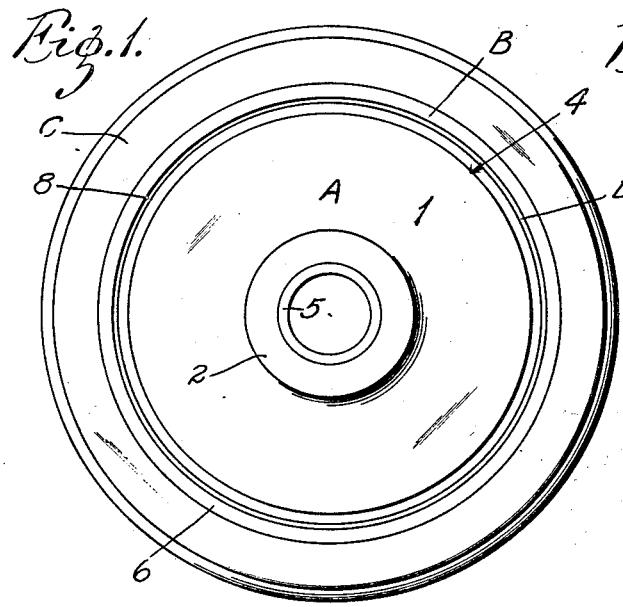
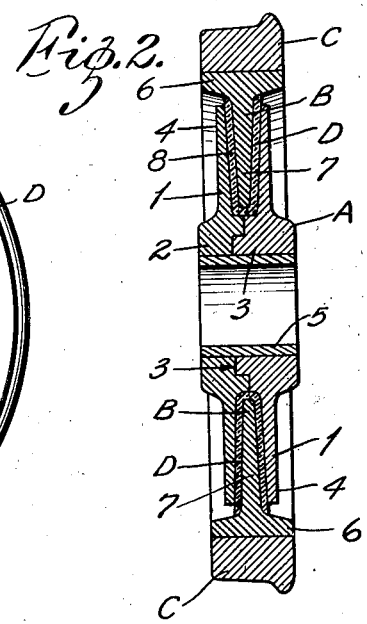
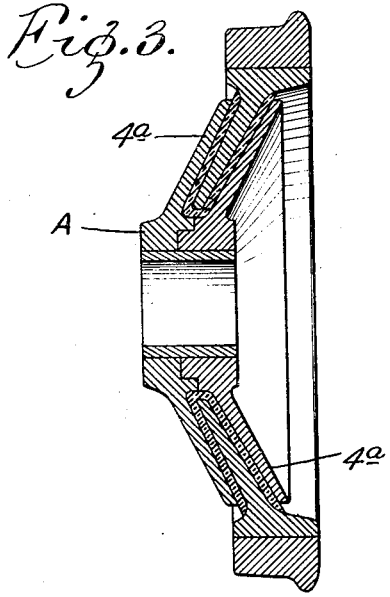
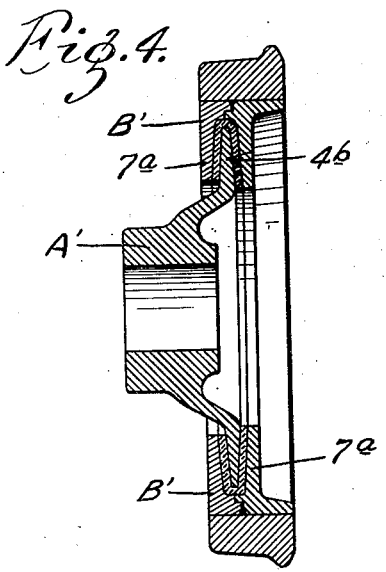
INVENTOR:
HIS ATTORNEYS.

Patented Nov. 27, 1934

1,982,043

UNITED STATES PATENT OFFICE 1,982,043

CAR WHEEL

Nelson R. Brownyer, Detroit, Mich., assignor to The Timken-Detroit Axle Company, Detroit, Mich., a corporation of Ohio Application December 23, 1931, Serial No. 582,698

2 Claims. (Cl. 295—11)

My invention relates to car wheels and has for its principal objects to interpose an elastic cushion between the hub and the rim thereof, which will reduce noise and vibration and insulate parts. Other objects are to simplify manufacture, facilitate repair and increase the durability of the wheel. The invention consists principally in a ring or rings of rubber cured under pressure between wide overlapping flanges on the inner and outer metal members of the wheel. The invention also consists in the parts and in the combination and arrangement of parts hereinafter described and claimed.

In the accompanying drawing, wherein like symbols refer to like reference numerals wherever they occur, Fig. 1 is a side view of a wheel embodying my invention;

Fig. 2 is a longitudinal sectional view thereof; and

Figs. 3 and 4 are longitudinal sectional views of wheels illustrating modifications.

My wheel comprises a hub member A, a metal felloe member B, a metal rim C surrounding said felloe member and a rubber member D interposed between the hub member and the felloe member.

In the construction illustrated in Fig. 2, the hub member A is made in two longitudinally separable sections 1 whose nave or elongated central portions 2 have their meeting faces offset and matched to form a tongue and groove joint 3. Each of these hub sections has a wide annular flange 4 spaced from its meeting face so that the flanges of the two members are spaced a considerable distance apart. A suitable sleeve or bushing 5 extends through and is press-fitted in the bores of said sections and serves as a means of holding them together.

The felloe member B comprises a somewhat elongated ring 6 of greater diameter than the flanges of the hub member and itself having a wide annular flange 7 extending inwardly from its inward surface between the flanges of the hub member with its inner margin spaced from the nave portion of the hub member. Thus a space is left between the side faces of the inner and outer flanges and between the peripheral portion of the felloe flange and the nave of the hub member, which space is hereinafter designated as U-shaped. This space is completely filled with rubber 8 or like material. The metal surfaces, which are in contact with the rubber, are left rough. The rubber is molded in place under pressure while the hub and felloe members are firmly held in proper spaced relation to one another.

The rim member C is of annular form and is preferably shrunk on the felloe. On account of the molding of the rubber in place under pressure and the press-fitting of the bushing in the bores of the hub sections, it is practicable to dispense with mechanical fasteners; but if desired, the parts may be clamped together by means of bolts or rivets extending through the flanges of the hub member parallel with the axis of the wheel.

It is noted that both sides of both legs of the wide U-shaped ring 8 of rubber bear throughout their entire area against the rough metal flanges and adhere thereto with such great tenacity that there is no need for other fastening devices. In such case, the rubber carries the vertical load mainly "in shear"; that is, the tendency of the hub member to move down relatively to the felloe member due to the weight of the car sets up stresses in the rubber tending to shear the rubber in vertical planes through the entire width thereof. The band of rubber next to and in the plane of the inner periphery of the felloe flange acts mainly in compression and is less important than the portions which act as shown and described.

In the construction illustrated in Fig. 2 and hereinbefore described, the flanges 4 are disposed substantially perpendicularly to the axis of the wheel. In the modification illustrated in Fig. 3, the flanges 4a are disposed obliquely to the axis of the wheel in the form of cones, the two constructions being otherwise similar.

In the construction illustrated in Fig. 2 and hereinbefore described, the hub member A is composed of two mating parts 1 and the felloe member B is made as a single piece. In the modification illustrated in Fig. 4, the hub member A' is made in a single piece with a single angular flange 4b located at one end of the hub; and the felloe member B' is composed of two mating parts with inwardly extending flanges 7a that straddle the single flange 4b of the hub member. As the rim is shrunk onto said mating felloe members, and the rubber cured against its flanges, no other means is needed for holding them together. The construction may be otherwise modified without departing from my invention and I do not wish to be restricted to the constructions illustrated.

What I claim is:

1. In a car wheel, a cylindrical rim member having an inwardly extending flange provided thereon; a pair of apertured cylindrical hub members disposed in abutting axial alignment and concentrically disposed with respect to said rim member, said hub members having outwardly extending flanges provided thereon disposed on opposite sides of, and overlapping the flange provided on said rim member, the opposed surfaces of said flanges being substantially parallel from their inner to their outer peripheries; said rim and hub member flanges being completely spaced from each other and having resilient material disposed at least between the parallel surfaces thereof; and a cylindrical sleeve disposed within the aligned portions of said hub members and securing the latter together in operative relationship, said sleeve having an axial length that is at least as great as the combined axial length of said hub members.

2. The construction set forth in claim 1, wherein the abutting portions of said hub members are disposed in overlapping telescoping relationship.

NELSON R. BROWNYER.